United States Patent
Hong et al.

(10) Patent No.: US 12,478,251 B2
(45) Date of Patent: Nov. 25, 2025

(54) GLAUCOMA PROGRESSION PREDICTION SYSTEM AND METHOD

(71) Applicant: THE CATHOLIC UNIVERSITY OF KOREA INDUSTRY-ACADEMIC COOPERATION FOUNDATION, Seoul (KR)

(72) Inventors: Kyung Euy Hong, Seoul (KR); Chan Kee Park, Seoul (KR); Hae Young Park, Seoul (KR); Kyoung In Jung, Seoul (KR); Da Young Shin, Seongnam-si (KR); Sung-Ah Kim, Seoul (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 73 days.

(21) Appl. No.: 18/577,748

(22) PCT Filed: Jul. 6, 2022

(86) PCT No.: PCT/KR2022/009801
§ 371 (c)(1),
(2) Date: Jan. 9, 2024

(87) PCT Pub. No.: WO2023/282642
PCT Pub. Date: Jan. 12, 2023

(65) Prior Publication Data
US 2024/0315555 A1     Sep. 26, 2024

(30) Foreign Application Priority Data
Jul. 9, 2021  (KR) .................. 10-2021-0090305

(51) Int. Cl.
*A61B 3/12*    (2006.01)
*A61B 3/00*    (2006.01)
*A61B 3/10*    (2006.01)

(52) U.S. Cl.
CPC .......... *A61B 3/1233* (2013.01); *A61B 3/0025* (2013.01); *A61B 3/102* (2013.01); *A61B 3/1241* (2013.01)

(58) Field of Classification Search
CPC ..... A61B 3/0025; A61B 3/102; A61B 3/1241; A61B 3/1233
See application file for complete search history.

(56) References Cited

U.S. PATENT DOCUMENTS

| 10,485,423 B2 | 11/2019 | Huang et al. |
| 2016/0228000 A1 | 8/2016 | Spaide |
| 2023/0377234 A1* | 11/2023 | Yamada .................. G06T 11/40 |

FOREIGN PATENT DOCUMENTS

| JP | 2004-502483 A | 1/2004 |
| JP | 6316298 B2 | 9/2015 |

(Continued)

*Primary Examiner* — Gerald Johnson
(74) *Attorney, Agent, or Firm* — Bridgeway IP Law Group, PLLC; Jihun Kim

(57) ABSTRACT

A glaucoma progression prediction system and method for predicting the progression of glaucoma are described. The glaucoma progression prediction system comprises: an examination module provided to derive examination images captured of deep vessels of the eye; a measurement module for measuring the deep vessel density in the examination images; an analysis module for deriving the amount of change in the deep vessel density measured in the plurality of the examination images derived at certain intervals of time; and a determination module for determining the progression of glaucoma according to the amount of change in the deep vessel density.

8 Claims, 10 Drawing Sheets

(56) References Cited

FOREIGN PATENT DOCUMENTS

| KR | 10-1855012 B1 | 5/2018 |
| KR | 10-2019-0128292 A | 11/2019 |

\* cited by examiner

|  | Total n = 82 |
|---|---|
| Age, years | 57.66 (±12.89) |
| Sex, Male : Female | 34:48 |
| Hypertension, n(%) | 16 (19.51%) |
| Diabetes, n(%) | 10 (12.19%) |
| Disc hemorrhage, n(%) | 14 (17.07%) |
| Follow up duration, months | 34.37 (±4.07) |
| Axial length, mm | 25.02 (±1.17) |
| Best corrected visual acuity, decimal | 0.81 (±0.24) |
| Initial IOP, mmHg | 16.13 (±4.67) |
| Average IOP, mmHg | 14.93 (±4.63) |
| IOP fluctuation, mmHg | 1.20 (±3.76) |
| Initial RNFL average thickness, μm | 76.23 (±15.91) |
| Initial SITA 24-2 MD, dB | -5.06 (±6.49) |
| Initial SITA 24-2 PSD, dB | 4.67 (±4.29) |
| Initial SITA 24-2 VFI, % | 87.96 (±18.87) |
| Initial retinal SVD parapapillary area, % | 35.09 (±5.21) |
| Initial retinal DVD parapapillary area, % | 52.37 (±4.15) |
| Initial retinal DVD macula area, % | 51.67 (±2.06) |
| Retinal SVD fluctuation parapapillary area, % | 3.10 (±4.56) |
| Retinal DVD fluctuation parapapillary area, % | 2.99 (±2.60) |
| Retinal DVD fluctuation macula area, % | 1.12 (±0.96) |

FIG. 5

|  |  | retinal SVDF parapapillary area | retinal DVDF parapapillary area | retinal DVDF macula area |
|---|---|---|---|---|
| Age | r | -0.081 | -0.189 | -0.184 |
|  | p | 0.470 | 0.089 | 0.099 |
| CCT | r | -0.029 | 0.076 | -0.011 |
|  | p | 0.797 | 0.497 | 0.924 |
| AxI | r | 0.029 | -0.387 | 0.031 |
|  | p | 0.796 | 0.000 | 0.785 |
| Initial IOP | r | 0.015 | 0.106 | 0.013 |
|  | p | 0.894 | 0.342 | 0.906 |
| IOP fluctuation | r | 0.088 | 0.119 | 0.090 |
|  | p | 0.431 | 0.286 | 0.421 |
| Initial retinal SVD parapapillary area | r | 0.009 | 0.124 | -0.181 |
|  | p | 0.934 | 0.267 | 0.104 |
| Initial retinal DVD parapapillary area | r | -0.213 | 0.167 | 0.037 |
|  | p | 0.055 | 0.133 | 0.741 |
| Initial retinal DVD macula area | r | -0.133 | 0.139 | 0.021 |
|  | p | 0.232 | 0.215 | 0.848 |
| Retinal SVDF parapapillary area | r | 1 | 0.118 | 0.177 |
|  | p |  | 0.292 | 0.112 |
| Retinal DVDF parapapillary area | r | 0.118 | 1 | 0.178 |
|  | p | 0.292 |  | 0.110 |
| Retinal DVDF macula area | r | 0.177 | 0.178 | 1 |
|  | p | 0.112 | 0.110 |  |

FIG. 6

|  |  | retinal SVDF parapapillary area | retinal DVDF parapapillary area | retinal DVDF macula area |
| --- | --- | --- | --- | --- |
| Retinal DVDF superotemporal area | r | 0.147 | 0.385 | 0.167 |
|  | p | 0.187 | 0.000 | 0.133 |
| Retinal DVDF superonasal area | r | 0.343 | 0.412 | 0.154 |
|  | p | 0.002 | 0.000 | 0.167 |
| Retinal DVDF inferotemporal area | r | 0.268 | 0.309 | 0.124 |
|  | p | 0.015 | 0.005 | 0.267 |
| Retinal DVDF inferonasal area | r | 0.384 | 0.073 | -0.094 |
|  | p | 0.000 | 0.514 | 0.401 |
| Initial RNFL average thickness | r | -0.111 | -0.212 | 0.084 |
|  | p | 0.319 | 0.056 | 0.451 |
| Initial SITA 24-2 MD | r | -0.035 | -0.370 | 0.225 |
|  | p | 0.755 | 0.001 | 0.042 |
| Initial SITA 24-2 PSD | r | 0.002 | 0.034 | 0.187 |
|  | p | 0.987 | 0.758 | 0.092 |
| Initial SITA 24-2 VFI | r | -0.435 | -0.051 | -0.080 |
|  | p | 0.000 | 0.651 | 0.477 |
| RNFL slope | r | -0.037 | -0.192 | -0.124 |
|  | p | 0.742 | 0.084 | 0.265 |
| MD slope | r | -0.144 | -0.357 | -0.213 |
|  | p | 0.198 | 0.001 | 0.055 |
| PSD slope | r | -0.093 | 0.255 | -0.200 |
|  | p | 0.406 | 0.021 | 0.072 |
| VFI slope | r | -0.116 | -0.378 | -0.204 |
|  | p | 0.299 | 0.000 | 0.066 |

FIG. 7

| Variable | High retinal DVDF parapapillary area (n=33) | Low retinal DVDF parapapillary area (n=49) | P value |
|---|---|---|---|
| Age, years | 54.07 (±14.37) | 59.89 (±11.62) | 0.047 |
| Sex, Female, n(%) | 22 (66.67%) | 26 (53.06%) | 0.654 |
| Hypertension, n(%) | 8 (24.24%) | 8 (16.32%) | 0.265 |
| Diabetes, n(%) | 2 (6.06%) | 8 (16.32%) | 0.500 |
| Disc hemorrhage, n(%) | 4 (12.12%) | 10 (20.40%) | 0.500 |
| CCT, μm | 527.87 (±106.00) | 525.93 (±84.96) | 0.930 |
| AxL, mm | 21.15 (±9.15) | 25.12 (±1.11) | 0.018 |
| Best corrected visual acuity, decimal | 0.73 (±0.27) | 0.78 (±0.24) | 0.413 |
| Initial IOP, mmHg | 16.78 (±4.93) | 15.48 (±4.89) | 0.232 |
| Average IOP, mmHg | 16.42 (±5.86) | 15.51 (±5.41) | 0.470 |
| IOP fluctuation, mmHg | 3.09 (±2.59) | 2.63 (±2.08) | 0.379 |
| Central scotoma, n(%) | 5 (15.15%) | 19 (38.77%) | 0.085 |
| Initial retinal SVD parapapillary area, % | 36.04 (±5.28) | 34.53 (±5.21) | 0.204 |
| Initial retinal DVD parapapillary area, % | 53.09 (±5.15) | 52.05 (±3.21) | 0.306 |
| Initial retinal DVD macula area, % | 51.97 (±2.59) | 51.38 (±1.65) | 0.213 |
| Retinal SVD fluctuation parapapillary area, % | 3.12 (±3.68) | 3.20 (±5.19) | 0.928 |
| Retinal DVD fluctuation macula area, % | 1.13 (±1.27) | 1.07 (±0.68) | 0.812 |
| Initial RNFL average thickness, μm | 71.33 (±16.71) | 78.59 (±14.56) | 0.040 |
| Initial SITA 24-2 MD, dB | -8.63 (±8.49) | -3.02 (±3.40) | 0.000 |
| Initial SITA 24-2 PSD, dB | 4.80 (±4.21) | 4.83 (±4.47) | 0.977 |
| Initial SITA 24-2 VFI, % | 87.78 (±18.52) | 87.63 (±19.51) | 0.977 |
| RFNL thickness slope, μm/year | -0.78 (±0.91) | -0.53 (±0.48) | 0.166 |
| SITA 24-2 MD slope, dB/year | -0.39 (±0.58) | -0.16 (±0.20) | 0.033 |
| SITA 24-2 PSD slope, dB/year | 0.15 (±0.47) | 0.13 (±0.26) | 0.124 |
| SITA 24-2 VFI slope, %/year | -1.25 (±1.94) | -0.45 (±0.69) | 0.027 |

FIG. 8

|  | Univariate | | Multivariate | |
| --- | --- | --- | --- | --- |
|  | β (95% CI) | P value | β (95% CI) | P value |
| Age | -.195 (-.014 to .002) | .116 | NA | NA |
| AxI | -.215 (-.161 to .006) | .069 | -.088 (-.107 to .043) | .404 |
| CCT | -.005 (-.002 to .002) | .969 | NA | NA |
| Initial IOP | -.003 (-.021 to .020) | .981 | NA | NA |
| IOP fluctuation | -.043 (-.045 to .030) | .681 | NA | NA |
| Initial RNFL thickness | .218 (-.013 to .001) | .109 | NA | NA |
| Initial MD of SITA 24-2 | .213 (-.005 to .032) | .142 | NA | NA |
| Initial PSD of SITA 24-2 | -.015 (-.030 to .033) | .926 | NA | NA |
| Initial VFI of SITA 24-2 | .049 (-.009 to .007) | .787 | NA | NA |
| Initial retinal SVD parapapillary area | -.183 (-.034 to .005) | .146 | NA | NA |
| Initial retinal DVD parapapillary area | .035 (-.019 to .026) | .756 | NA | NA |
| Initial retinal DVD macula area | -.031 (-.055 to .043) | .802 | NA | NA |
| retinal SVDF parapapillary area | -.182 (-.041 to .009) | .194 | NA | NA |
| retinal DVDF parapapillary area | -.439 (.032 to .108) | .000 | -.398 (.031 to .096) | .000 |
| retinal DVDF macula area | -.306 (-.238 to -.028) | .014 | -.261 (-.205 to -.022) | .016 |

FIG. 9

|  | Univariate | | Multivariate | |
| --- | --- | --- | --- | --- |
|  | ß (95% CI) | P value | ß (95% CI) | P value |
| Age | -.053 (-.017 to .012) | .695 | NA | NA |
| AxL | -.067 (-.195 to .114) | .603 | NA | NA |
| CCT | .176 (-.001 to .007) | .115 | .144 (.000 to .007) | .187 |
| Initial IOP | -.070 (-.048 to .028) | .594 | NA | NA |
| IOP fluctuation | .096 (-.040 to .099) | .406 | NA | NA |
| Initial RNFL thickness | .037 (-.011 to .015) | .807 | NA | NA |
| Initial MD of SITA 24-2 | .124 (-.020 to .047) | .436 | NA | NA |
| Initial PSD of SITA 24-2 | -.185 (-.087 to .028) | .308 | NA | NA |
| Initial VFI of SITA 24-2 | -.160 (-.021 to .009) | .430 | NA | NA |
| Initial retinal SVD parapapillary area | .154 (-.016 to .057) | .267 | NA | NA |
| Initial retinal DVD parapapillary area | -.121 (-.062 to .021) | .329 | NA | NA |
| Initial retinal DVD macula area | -.054 (-.109 to .073) | .693 | NA | NA |
| retinal SVDF parapapillary area | -.245 (-.083 to .009) | .181 | -.200 (-.054 to .011) | .067 |
| retinal DVDF parapapillary area | -.272 (.003 to .142) | .042 | -.202 (-.004 to .111) | .066 |
| retinal DVDF macula area | -.085 (-.256 to .133) | .531 | NA | NA |

FIG. 10

GLAUCOMA PROGRESSION PREDICTION SYSTEM AND METHOD

CROSS-REFERENCE TO RELATED APPLICATION

This application claims priority to and the benefit of Korean Patent Application No. 10-2021-0090305 filed in the Korean Intellectual Property Office on Jul. 9, 2021, the entire contents of which are incorporated herein by reference.

TECHNICAL FIELD

The present invention relates to a glaucoma progression prediction system and method, and more specifically, to a glaucoma progression prediction system and method for predicting the progression of glaucoma.

BACKGROUND ART

Glaucoma is one of the diseases in which the optic nerve, which transmits visual information from the eye to the brain, is damaged. When the optic nerve is damaged due to glaucoma, the field of view gradually narrows and eventually leads to blindness. There are almost no symptoms until the end stage, making early diagnosis difficult.

In addition, unlike other eye diseases such as cataracts, once the optic nerve is damaged due to glaucoma, it is impossible to restore the function of the optic nerve even with surgery, so it is necessary to make an accurate diagnosis early and provide consistent treatment and management.

Glaucoma is a progressive disease that causes damage to the optic nerve and visual field defects. The gradual loss of axons in the retinal nerve fiber layer (RNFL) occurs for some reason, resulting in functional changes such as narrowing of the field of view.

In order for these functional changes to be measured through visual field testing, nerve fibers must be damaged by approximately 30 to 50%. In addition, it is known that these changes in visual field are preceded by changes in an area called the optic nerve head (ONH).

Therefore, to early predict the progression and course of glaucoma, it is important to observe changes in the shape of the optic nerve head.

The optic nerve head is the part where a bundle of nerve fibers connecting the retina and the brain come together just before exiting the eye. This part is a bright, full moon-shaped, round part that is distinct from the surrounding retina. In case where the center of the optic nerve head is normal, it is depressed in the shape of a pool, and this area has few blood vessels and is bright and pale in color. The area around the depression is surrounded by orange or pink nerve tissue made up of nerve fibers in a ring shape. When glaucoma occurs, the optic nerve fibers die and disappear, causing the nerve rim to shrink and the depression to become wider and deeper.

The optic nerve is a bundle of nerve fibers that are wires that connect the retina in the eye to the brain and gather at the optic nerve head like a thin thread. If some of these fibers are damaged, the nerve fibers in that area cannot be observed, so an early diagnosis of glaucoma can be made through imaging of the retinal nerve fiber layer before visual field defects occur.

Since optical coherence tomography (OCT) equipment using a laser can be used to measure the thickness of the retinal nerve fiber layer, images of the peripapillary retinal nerve fiber layer (p-RNFL) around the optic nerve head can also be obtained. However, the conventional art had limitations of not being able to provide objective diagnostic data for early glaucoma using the image information.

(Patent Document 1) Japanese Patent Application Publication No. 2004-502483
(Patent Document 2) Japanese Patent Registration No. 6316298

DISCLOSURE

Technical Problem

The object of the present invention to solve the above problems is to provide a glaucoma progression prediction system and prediction method for predicting the progression of glaucoma.

The technical objects to be achieved by the present invention are not limited to the technical objects mentioned above, and other technical objects not mentioned may be clearly understood by those skilled in the art from the following descriptions.

Technical Solution

In order to achieve the above object, the configuration of the present invention provides a glaucoma progression prediction system comprising an examination module provided to derive an examination image captured of a deep vessel of an eye; a measurement module that measures a deep vessel density in the examination image; an analysis module that derives an amount of changes in the deep vessel densities measured in a plurality of the examination images derived at regular intervals; and a determination module that determines glaucoma progression according to the amount of changes in the deep vessel densities.

In an embodiment of the present invention, the examination module is provided to derive the examination image of a parapapillary area or macular area of the eye.

In an embodiment of the present invention, the examination module is provided to derive the examination image by performing an optical coherence tomography angiography (OCTA) test on the eye.

In an embodiment of the present invention, the measurement module is provided to measure the deep blood vessel density by performing image binarization of the examination image.

In an embodiment of the present invention, the determination module is provided to determine that the greater the amount of changes in the deep blood vessel densities, the faster the glaucoma progression.

In order to achieve the above object, the configuration of the present invention provides A method for predicting glaucoma progression using the glaucoma progression prediction system of claim 1, comprising the steps of a) deriving a plurality of examination images of a deep blood vessel of an eye captured at regular intervals by the examination module; b) measuring deep blood vessel densities from the plurality of examination images by the measurement module; c) deriving an amount of changes in a plurality of the deep blood vessel densities by the measurement module; and d) determining glaucoma progression according to the amount of changes in the deep blood vessel densities by the determination module.

In an embodiment of the present invention, the step of a) is provided to derive the examination image of a parapapillary area or macular area of the eye.

In an embodiment of the present invention, the step of a) is provided to derive the examination image by performing an optical coherence tomography angiography (OCTA) test on the eye.

In an embodiment of the present invention, the step of b) comprises the steps of b1) binarizing the examination image; and b2) measuring the deep blood vessel density of the binarized examination image.

In an embodiment of the present invention, the step of d) is provided to determine that the greater the amount of changes in the deep blood vessel densities, the faster the glaucoma progression.

Advantageous Effects

According to the effect of the present invention including the above configuration, the progression of glaucoma can be accurately diagnosed using the variability of the deep blood vessel density.

The effects of the present disclosure are not limited to the above-mentioned effects, and it should be understood that the effects of the present disclosure include all effects that could be inferred from the configuration of the invention described in the detailed description of the invention or the appended claims.

DESCRIPTION OF DRAWINGS

FIG. 5 is a table showing the characteristics of subjects to be examined.

FIGS. 6 and 7 are tables showing a correlation between variable area classification of deep blood vessel densities and variables of glaucoma patients.

FIG. 8 is a table comparing the results according to a difference in deep blood vessel densities in a parapapillary area.

FIG. 9 is a table showing an amount of changes in MD slope and linear regression analysis of glaucoma patients.

FIG. 10 is a table showing an amount of changes in RNFL slope and linear regression analysis of glaucoma patients.

BEST MODE

Figure 1:
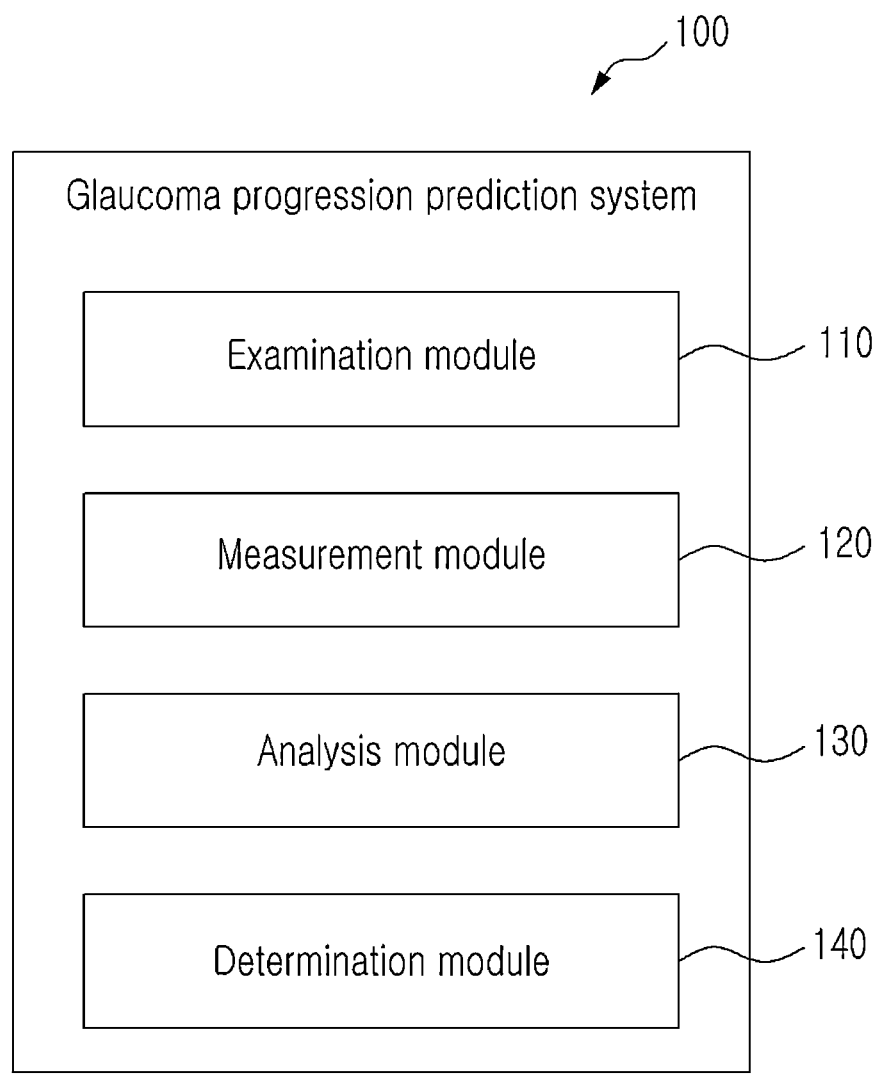
FIG. 1 is a configuration diagram illustrating an example of a glaucoma progression prediction system according to an embodiment of the present invention.

The most preferable embodiment according to the present invention provides a glaucoma progression prediction system comprising an examination module provided to derive an examination image captured of a deep vessel of an eye; a measurement module that measures a deep vessel density in the examination image; an analysis module that derives an amount of changes in the deep vessel densities measured in a plurality of the examination images derived at regular intervals; and a determination module that determines glaucoma progression according to the amount of changes in the deep vessel densities.

MODE FOR INVENTION

Hereinafter, the present invention will be explained with reference to the accompanying drawings. The present invention, however, may be modified in various different ways, and should not be construed as limited to the embodiments set forth herein. Also, in order to clearly explain the present invention, portions that are not related to the present invention are omitted, and like reference numerals are used to refer to like elements throughout.

Throughout the specification, it will be understood that when an element is referred to as being "connected (accessed, contacted, coupled) to" another element, it may be "directly connected to" the other element, or intervening elements or layers may be present. Also, it will also be understood that when a component "includes" an element, unless stated otherwise, it should be understood that the component does not exclude other elements.

The terms used in this specification are merely used to describe particular embodiments, and are not intended to limit the present disclosure. Expression in the singular number include a plural forms unless the context clearly indicates otherwise. In this specification, the term "comprise" or "have" is intended to designate characteristic, numbers, steps, operations, elements, components, or combinations thereof, but it is not intended to preclude the possibility of the presence or addition of one or more other features, numbers, steps, operations, elements, components, or combinations.

Hereinafter, embodiments of the present disclosure will be described in detail with reference to the accompanying drawings.

FIG. 1 is a configuration diagram illustrating an example of a glaucoma progression prediction system according to an embodiment of the present invention.

As illustrated in FIG. 1, a glaucoma progression prediction system 100 may include an examination module 110, a measurement module 120, an analysis module 130, and a determination module 140.

The examination module 110 may be provided to produce an examination image of the deep blood vessels of the eye.

Specifically, the examination module 110 may be provided to derive an examination image of the parapapillary area or macular area of the eye.

In addition, the examination module 110 may be provided to derive the examination image by performing an optical coherence tomography angiography (OCTA) test on the parapapillary area or macular area of the eye.

In this case, the examination module 110 may be provided to capture and store a plurality of examination images at regular intervals such as one month, one year, etc.

The measurement module 120 may be provided to measure a deep vessel density in the examination image.

Specifically, the measurement module 120 may be provided to measure the deep blood vessel density by performing image binarization of the examination image.

Figure 2:
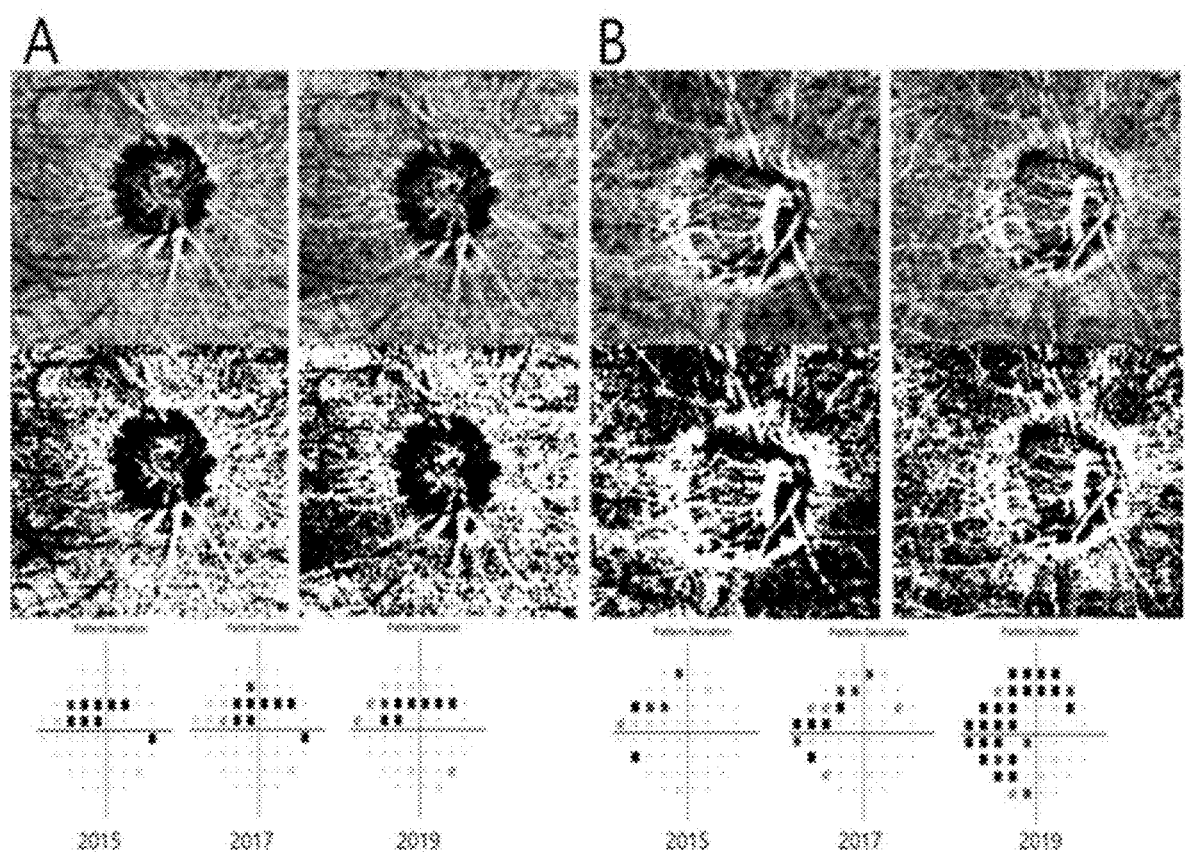
FIG. 2 is a diagram illustrating an example of the deep blood vessel density for the image binarization of an examination image and the examination image for group A and group B.

FIG. 2 is a diagram illustrating an example of the deep blood vessel density for the image binarization of an examination image and the examination image for group A and group B.

In FIG. 2, group A is an examination image of 53-year-old female patient with no underlying disease, and group B is an examination image of a 59-year-old female patient.

As illustrated in FIG. 2, the measurement module 120 may be provided to display the examination images captured at regular intervals by binarizing the examination images into black and white. In addition, the measurement module 120 may be provided to measure the deep blood vessel density in each of the binarized examination images.

The analysis module 130 may be provided to derive an amount of changes in the deep blood vessel densities measured from the plurality of examination images derived at regular intervals.

As illustrated in FIG. 2, it can be confirmed that the amount of changes in deep blood vessel densities in group B is greater than that in deep blood vessel densities in group A in the examination images captured at intervals of 2 years.

The determination module 140 may be provided to determine glaucoma progression according to the amount of changes in the deep blood vessel densities.

In this case, the determination module 140 may be provided to determine that the greater the amount of changes in the deep blood vessel densities, the faster the progression of glaucoma.

For example, in FIG. 2, the determination module 140 may be provided to predict that the glaucoma progresses of group B is faster than that of group A and the glaucoma of group B will progress more rapidly in the future.

Hereinafter, a method for predicting glaucoma progression using the glaucoma progression prediction system 100 described above will be described.

Figure 3:
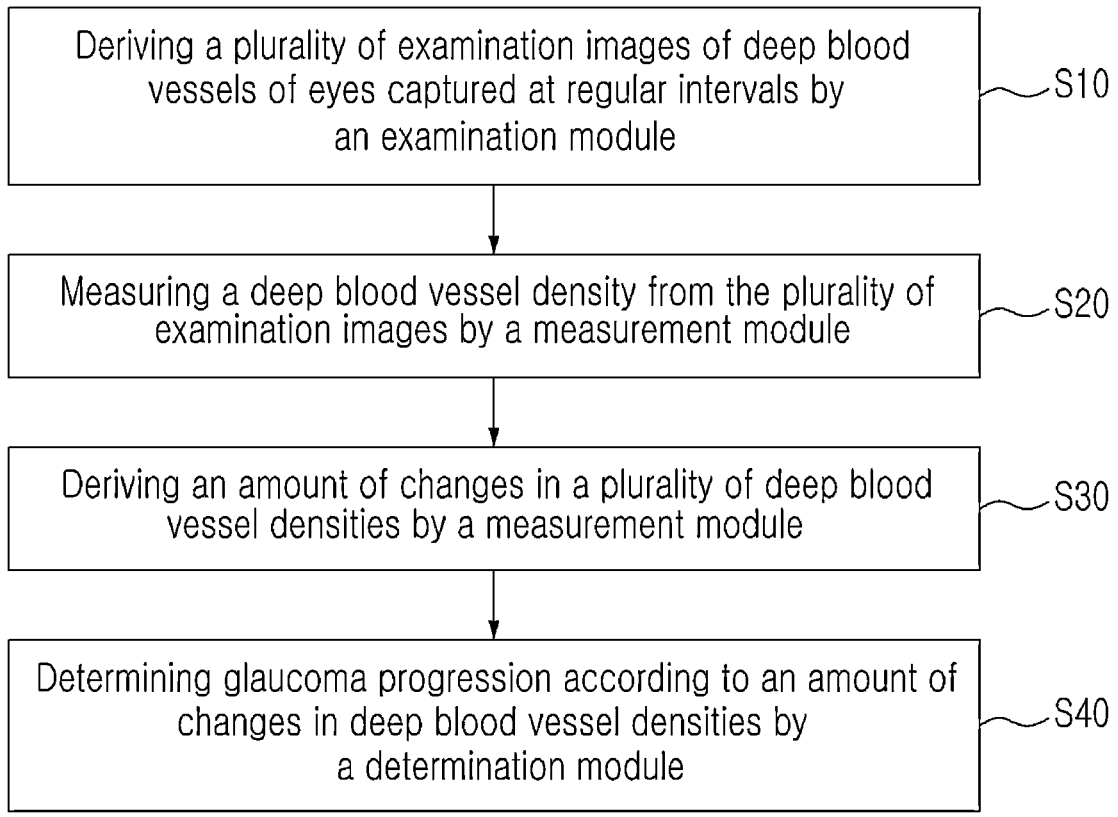
FIG. 3 is a flowchart of a method for predicting glaucoma progression using a glaucoma progression prediction system according to an embodiment of the present invention.

FIG. 3 is a flowchart of a method for predicting glaucoma progression using a glaucoma progression prediction system according to an embodiment of the present invention.

Referring to FIG. 3, in a method for predicting glaucoma progression using the glaucoma progression prediction system 100, a step of deriving a plurality of examination images of the deep blood vessels of the eye captured at regular intervals by the examination module (S10) may be first performed.

In the step of deriving a plurality of examination images of the deep blood vessels of the eye captured at regular intervals by the examination module (S10), the examination module 110 may be provided to derive the examination images of the parapapillary area or macular area of the eye.

In addition, in the step of deriving a plurality of examination images of the deep blood vessels of the eye captured at regular intervals by the examination module (S10), the examination module 110 may be provided to derive the examination images by performing an optical coherence tomography angiography (OCTA) test on the parapapillary area or macular area of the eye.

In this case, the step of deriving a plurality of examination images of the deep blood vessels of the eye captured at regular intervals by the examination module (S10) may be provided to capture and store a plurality of examination images at regular intervals such as one month, one year, etc.

After the step of deriving a plurality of examination images of the deep blood vessels of the eye captured at regular intervals by the examination module (S10), a step of measuring a deep blood vessel density from the plurality of examination images by the measurement module (S20) may be performed.

Figure 4:
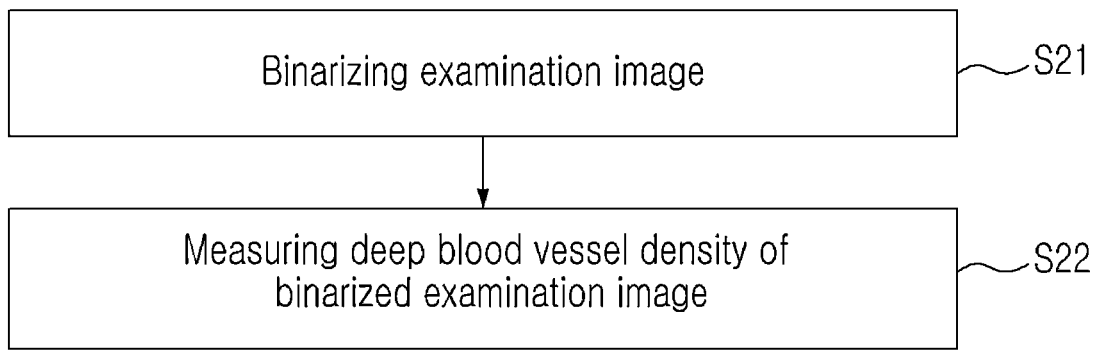
FIG. 4 is a flowchart of a step for measuring a deep blood vessel density according to an embodiment of the present invention.

FIG. 4 is a flowchart of a step for measuring a deep blood vessel density according to an embodiment of the present invention.

Referring further to FIG. 4, in the step of measuring a deep blood vessel density from the plurality of examination images by the measurement module (S20), a step of binarizing the examination image (S21) may be first be performed.

In the binarizing the examination image (S21), the measurement module 120 may be provided to perform image binarization of the examination image and measure the deep vessel density in the examination image. Specifically, in the step of measuring a deep blood vessel density from the plurality of examination images by the measurement module (S20), the measurement module 120 may be provided to display the examination images captured at regular intervals by binarizing the examination images into black and white.

After the step of binarizing the examination image (S21), a step of measuring a deep blood vessel density of the binarized examination image (S22) may be performed.

In the step of measuring a deep blood vessel density of the binarized examination image (S22), the measurement module 120 may be provided to measure the deep blood vessel density in each of the binarized examination images.

Here, the deep blood vessel density may be derived through the number of black or white values in the binarized examination image.

After the step of measuring a deep blood vessel density from the plurality of examination images by the measurement module (S20), a step of deriving an amount of changes in a plurality of deep blood vessel densities by the measurement module (S30) may be performed.

In the step of deriving an amount of changes in a plurality of deep blood vessel densities by the measurement module (S30), the analysis module 130 may be provided to derive an amount of changes in the deep blood vessel densities measured from the plurality of examination images derived at regular intervals.

For example, in the step of deriving an amount of changes in a plurality of deep blood vessel densities by the measurement module (S30), the amount of changes in the deep blood vessel densities may be derived by deriving an amount of changes in the numbers of black or white in the binarized examination image.

After the step of deriving an amount of changes in a plurality of deep blood vessel densities by the measurement module (S30), a step of determining glaucoma progression according to the amount of changes in the deep blood vessel densities by the determination module (S40) may be performed.

In the step of determining glaucoma progression according to the amount of changes in the deep blood vessel densities by the determination module (S40), the determination module 140 may be provided to determine that the greater the amount of changes in the deep blood vessel densities, the faster the progression of glaucoma.

In this case, the step of determining glaucoma progression according to the amount of changes in the deep blood vessel densities by the determination module (S40) may be provided to form a preset table for glaucoma progression according to the amount of changes in the deep blood vessel densities, and predict glaucoma progression according to the amount of changes in the deep blood vessel densities based on the table.

Hereinafter, the basis for predicting the glaucoma progression according to the amount of changes in deep blood vessel densities will be described.

FIG. 5 is a table showing the characteristics of subjects to be examined.

Referring to FIG. 5, the two examinations typically performed in glaucoma patients are the results of a visual field test to determine visual function and the results of optical tomography to determine whether the thickness of the optic nerve layer is reduced. The correlation between the previous two results and the superficial and deep blood vessel densities of the retina, which can be confirmed by OCTA, was investigated by dividing it into the parapapillary area and macula area. In addition, as shown in the table in FIG. 5, the patients' age, gender, underlying disease, disc hemorrhage, etc. were also investigated.

FIGS. 6 and 7 are tables showing a correlation between variable area classification of deep blood vessel densities and variables of glaucoma patients.

Referring to FIGS. 6 and 7, a correlation between the superficial and deep blood vessel densities of the retina, which were measured by OCTA, and each item was investigated by dividing it in the parapapillary area and macular area. Among the items, an amount of changes in deep blood vessel densities was found to have a significant correlation with the long axis of the eye, the initial mean deviation (MD) value of the visual field test, a MD slope, a pattern standard deviation (PSD) slope, and a visual field index (VFI) slope. When the optic nerve head area was divided into four areas, a significant correlation was confirmed with the density changes in the ST, SN, and IT areas. In comparison, the amount of changes in densities of superficial retinal blood vessels was found to be significantly correlated with the initial VFI value of visual field test and the amount of changes in densities in the SN, IT, and IN areas.

FIG. 8 is a table comparing the results according to a difference in deep blood vessel densities in a parapapillary area.

Still referring to FIG. 8, whether there was a significant difference between the group with large and small amount of changes in the deep retinal blood vessel densities in the parapapillary area. As a result, it was confirmed that subjects in the group with large amount of changes in deep retinal blood vessel densities in the parapapillary area were younger, had a shorter ocular long axis, had the thinner thickness of an initial retinal nerve fiber layer (RNFL), and had a lower MD value on initial visual field tests. The MD slope and VFI slope values were also negative, confirming a statistically significant tendency for the slope to be steeper.

FIG. 9 is a table of an amount of changes in MD slope and linear regression analysis of glaucoma patients.

Referring to FIG. 9, since there was a significant difference in MD slope and VFI slope between the group with large and small amount of changes in the retinal deep blood vessel densities in the parapapillary area, linear regression analysis was conducted to determine the factors causing this difference. Reviewing FIG. 9, it can be seen that in the case of MD slope, the amount of changes in deep retinal blood vessel densities is a statistically significant causal factor in both the parapapillary area and the macular area. In other words, in the case of the parapapillary area, it can be seen that as the amount of changes in the deep retinal blood vessel densities increases, the MD slope increases to a negative slope.

FIG. 10 is a table showing an amount of changes in RNFL slope and linear regression analysis of glaucoma patients.

Referring to FIG. 10, it can be seen that in the case of factors affecting the RNFL slope, an amount of changes in the superficial and deep blood vessel densities of the retinal parapapillary area is a causal factor with statistically insignificant significance. This is because the function of ganglion cells declines first, which is detected on a visual field test and then leads to loss of ganglion cells, which appears as a decrease in the thickness of the RNFL oct.

Figure 11:
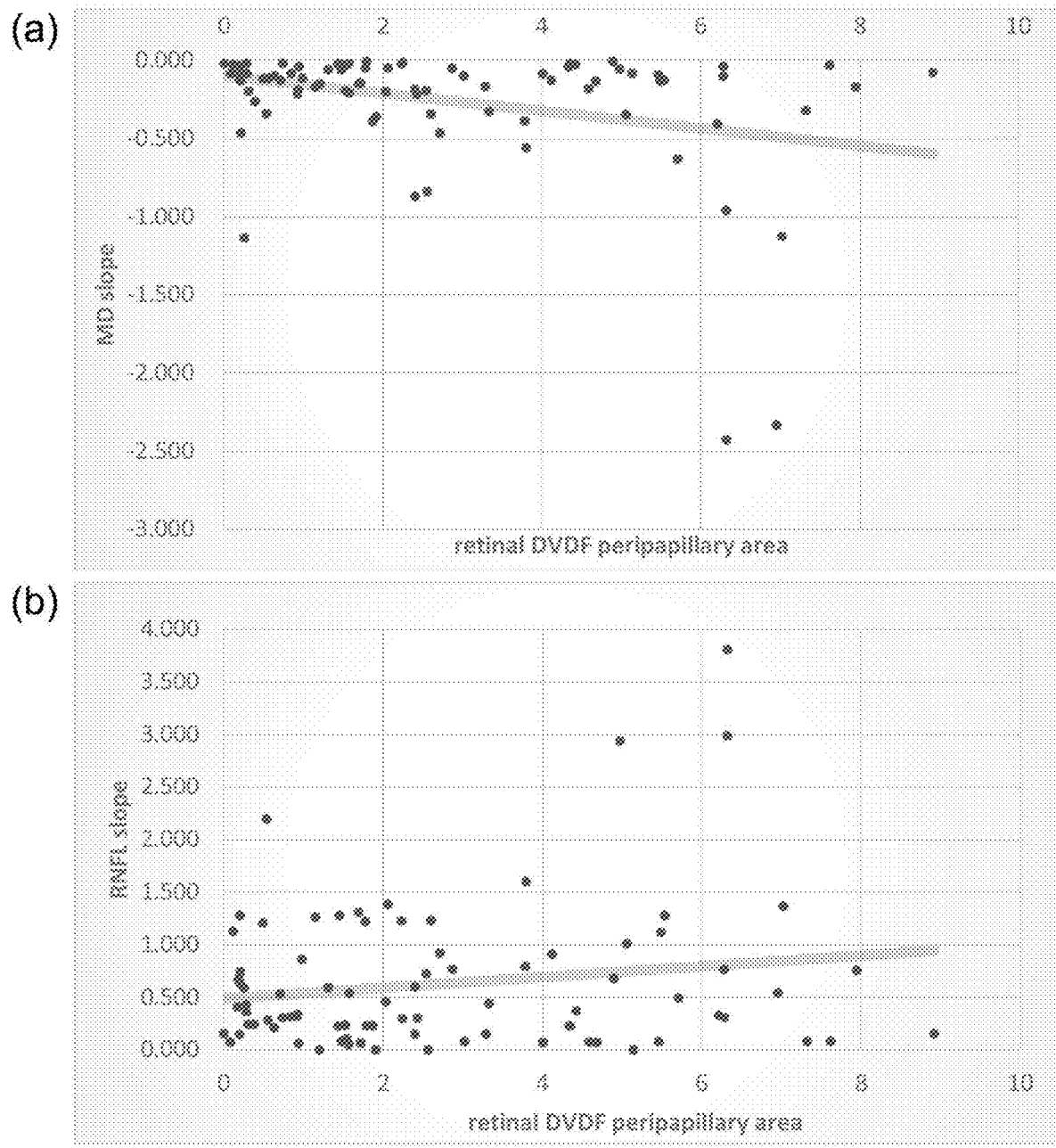
FIG. 11 shows linear regression graphs of MD slope and RNFL slope for retinal DVDF parapapillary area.

FIG. 11 shows linear regression graphs of MD slope and RNFL slope for retinal DVDF parapapillary area.

Referring to FIG. 11, when the amount of changes in the deep retinal blood vessel densities in the parapapillary area and the regression lines of the MD slope and RNFL slope are plotted on a graph, it can be seen that the slope function of the MD slope is larger than that of the RNFL.

To summarize the results, it can be seen that the amount of changes in the deep retinal blood vessel densities in the parapapillary area has a significant correlation with the glaucoma progression using visual field test, which is a functional test.

In several OCTA-related studies reported in recent years, the consistent correlation between the retinal deep vessel density or the density of retinal superficial blood vessels and the glaucoma progression has not been proven. However, in the present invention, as described above, it was confirmed that an amount of changes in retinal deep blood vessel densities has significant statistical significance, and the higher the amount of changes in retinal deep blood vessel densities, the more negative the MD slope, which is an indicator related to the speed of glaucoma progression.

Therefore, according to the present invention, the glaucoma progression can be accurately predicted with high reliability using the amount of changes in deep blood vessel densities.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the invention is to be defined by the scope of claims provided below, and all variations or modifications that can be derived from the meaning and scope of the claims as well as their equivalents are to be interpreted as being encompassed within the scope of the present invention.

DESCRIPTION OF REFERENCE NUMERALS

100: glaucoma progression prediction system
110: examination module
120: measurement module
130: analysis module
140: determination module

The invention claimed is:

1. A glaucoma progression prediction system comprising:
an examination module configured to derive an examination image captured of a deep blood vessel of an eye;
a measurement module configured to measure a deep blood vessel density in the examination image;
an analysis module configured to derive an amount of changes in deep blood vessel densities measured in a plurality of examination images derived at regular intervals; and
a determination module configured to determine a progression of glaucoma according to the amount of the changes in the deep blood vessel densities,
wherein the examination module is configured to derive an examination image of a parapapillary area or macular area of the eye.

2. The glaucoma progression prediction system of claim 1, wherein the examination module is configured to derive the examination image by performing an optical coherence tomography angiography (OCTA) test on the eye.

3. The glaucoma progression prediction system of claim 1, wherein the determination module is configured to determine that a greater amount of the changes in the deep blood vessel densities indicates a faster progression of the glaucoma.

4. A method for predicting glaucoma progression using the glaucoma progression prediction system of claim 1, the method comprising:
    deriving the plurality of examination images of the deep blood vessel of the eye captured at regular intervals by the examination module;
    measuring the deep blood vessel densities from the plurality of examination images by the measurement module;
    deriving the amount of the changes in the deep blood vessel densities by the measurement module; and
    determining the progression of the glaucoma according to the amount of the changes in the deep blood vessel densities by the determination module,
    wherein the deriving the plurality of examination images is provided to derive the examination image of the parapapillary area or the macular area of the eye.

5. The method of claim 4, wherein the deriving the plurality of examination images is provided to derive the plurality of examination images by performing an optical coherence tomography angiography (OCTA) test on the eye.

6. The method of claim 4, wherein the step d) determining the progression of the glaucoma is provided to determine that a greater amount of the changes in the deep blood vessel densities indicates a faster progression of the glaucoma.

7. A method for predicting glaucoma progression using the glaucoma progression prediction system of claim 1, the method comprising:
    deriving the plurality of examination images of the deep blood vessel of the eye captured at predetermined intervals by the examination module;
    measuring the deep blood vessel densities from the plurality of examination images by the measurement module;
    deriving the amount of the changes in the deep blood vessel densities by the measurement module; and
    determining the progression of the glaucoma according to the amount of the changes in the deep blood vessel densities by the determination module,
    wherein the measuring the deep blood vessel densities comprises:
    binarizing the plurality of examination images; and
    measuring the deep blood vessel densities of the binarized examination images.

8. A glaucoma progression prediction system comprising:
    an examination module configured to derive an examination image captured of a deep blood vessel of an eye;
    a measurement module configured to measure a deep blood vessel density in the examination image;
    an analysis module configured to derive an amount of changes in deep blood vessel densities measured in a plurality of examination images derived at regular intervals; and
    a determination module configured to determine a progression of glaucoma according to the amount of the changes in the deep blood vessel densities,
    wherein the measurement module is configured to measure the deep blood vessel density by performing image binarization of the examination image.

* * * * *